United States Patent
Giordano et al.

(10) Patent No.: US 10,103,411 B2
(45) Date of Patent: Oct. 16, 2018

(54) MULTIPLE VOLTAGE BATTERY PACK WITH COMMON BATTERY MANAGEMENT SYSTEM

(71) Applicant: Lear Corporation, Southfield, MI (US)

(72) Inventors: Federico Giordano, Valls (ES); Antoni Ferre Fabregas, Valls (ES)

(73) Assignee: Lear Corporation, Southfield, MI (US)

( * ) Notice: Subject to any disclaimer, the term of this patent is extended or adjusted under 35 U.S.C. 154(b) by 447 days.

(21) Appl. No.: 14/791,550

(22) Filed: Jul. 6, 2015

(65) Prior Publication Data

US 2017/0012324 A1    Jan. 12, 2017

(51) Int. Cl.
| | |
|---|---|
| H01M 10/0525 | (2010.01) |
| H01M 10/42 | (2006.01) |
| H01M 10/48 | (2006.01) |
| H01M 10/613 | (2014.01) |
| H01M 16/00 | (2006.01) |
| H02J 7/00 | (2006.01) |
| H02J 7/34 | (2006.01) |

(52) U.S. Cl.
CPC ... *H01M 10/4257* (2013.01); *H01M 10/0525* (2013.01); *H01M 10/482* (2013.01); *H01M 10/613* (2015.04); *H01M 16/00* (2013.01); *H02J 7/0042* (2013.01); *H02J 7/34* (2013.01); *H01M 2010/4271* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,436,570 B1 * | 8/2002 | Chalasani | H01M 2/1077 429/121 |
| 8,143,857 B2 | 3/2012 | Li | |
| 8,237,405 B2 | 8/2012 | Li | |
| 8,410,755 B2 | 4/2013 | Chau | |
| 8,652,670 B2 | 2/2014 | Uchida | |
| 8,940,423 B2 * | 1/2015 | Gadawski | H01M 2/1077 429/100 |
| 8,999,538 B2 * | 4/2015 | Fuhr | H01M 2/08 429/159 |
| 9,040,187 B2 * | 5/2015 | Bhardwaj | H01M 2/1027 29/623.1 |
| 2011/0003182 A1 | 1/2011 | Zhu | |
| 2011/0135975 A1 * | 6/2011 | Fuhr | H01M 2/08 429/53 |
| 2012/0319657 A1 | 12/2012 | Ke et al. | |

* cited by examiner

Primary Examiner — Tracy M Dove
(74) Attorney, Agent, or Firm — Brooks Kushman P.C.

(57) ABSTRACT

A battery pack includes a first battery, a second battery remotely separated from the first battery, components to be shared by the batteries, and a battery housing. The batteries and the components are contained within the battery housing. The batteries may be Lithium-Ion (Li-Ion) batteries having different voltages. The components to be shared by the batteries may include a battery module controller (BMC), a common I/O (COM), a cooling system, and protection mechanisms like fuses, transient voltage suppressors, and battery disconnection devices (JB/BDU). An electronic control unit remotely separated from the battery pack is configured to communicate with the battery module controller to control operation of the battery pack.

14 Claims, 3 Drawing Sheets

FIG. 1 (Background)

(Background)

MULTIPLE VOLTAGE BATTERY PACK WITH COMMON BATTERY MANAGEMENT SYSTEM

TECHNICAL FIELD

The present invention relates to automotive electrical energy battery assemblies having multiple individual batteries.

BACKGROUND

Some automotive battery assemblies include multiple (i.e., two or more) individual batteries. The battery assemblies are for conventional internal combustion engine (ICE) vehicles with energy recovery capabilities (usually known as micro-hybrids (µH)) as well as hybrid electric vehicles (HEV), plug-in hybrid electric vehicles (PHEV), and full electric vehicles (EV). The battery assemblies are of several types. Until now, most vehicles have a traditional 12V lead-acid battery while electric vehicles of all types (i.e., µH, HEV, PHEV, and EV) have Lithium-Ion (Li-Ion), Nickel-Metal-Hydride (NiMH), Lithium Polymer (Li-poly), or Lithium Iron Phosphate (LFP) batteries.

SUMMARY

A battery pack includes a first battery, a second battery remotely separated from the first battery, components to be shared by the batteries, and a battery housing. The batteries and the components to be shared by the batteries are contained within the battery housing.

The batteries may be Lithium-Ion batteries having different voltages.

The components may include a battery module controller configured to perform at least one of receive alarm messages from cell module controllers respectively associated with the batteries, measure voltages of the batteries, and control balancing time of the cell module controllers.

The components may further include a communications connector exposed to an environment external of the battery housing. The battery module controller is further configured to communicate with an external electronic control unit via the communications connector.

The components may further include a cooling system configured to control temperature of the batteries.

The components may further include a battery disconnection unit configured to disconnect the batteries from electrical connections external to the battery housing.

The battery module controller may be further configured to function as a gateway for the cooling system and the battery disconnection unit.

A battery assembly includes a battery pack and an electronic control unit remotely separated from the battery pack. The battery pack includes a first battery, a second battery remotely separated from the first battery, components common to both of the batteries, and a battery housing. The batteries and the components are contained within the battery housing. The electronic control unit is configured to control operation of the battery pack.

Another battery pack includes a first battery, a second battery, and a battery housing. The first battery has Lithium-Ion battery cells and a first cell module controller configured to perform cell balancing of the battery cells of the first battery. The second battery has Lithium-Ion battery cells and a second cell module controller configured to perform cell balancing of the battery cells of the second battery. The batteries are remotely separated from one another and have different voltages. A battery module controller is in communication with the cell module controllers and is configured to control the cell module controllers. The batteries and the battery module controller are contained within the battery housing.

This battery pack may further include a communications connector contained within the battery housing and exposed to an environment external to the battery housing, a cooling system contained within the battery housing and configured to control temperature of the batteries, and a battery disconnection unit contained within the battery housing and configured to disconnect the batteries from electrical connections external to the battery housing. The battery module controller is in communication with the connector, the cooling system, and the battery disconnection unit and is further configured to communicate with an external electronic control unit via the communications connector to effect control of the cell module controllers, the cooling system, and the battery disconnection unit according to the electronic control unit.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
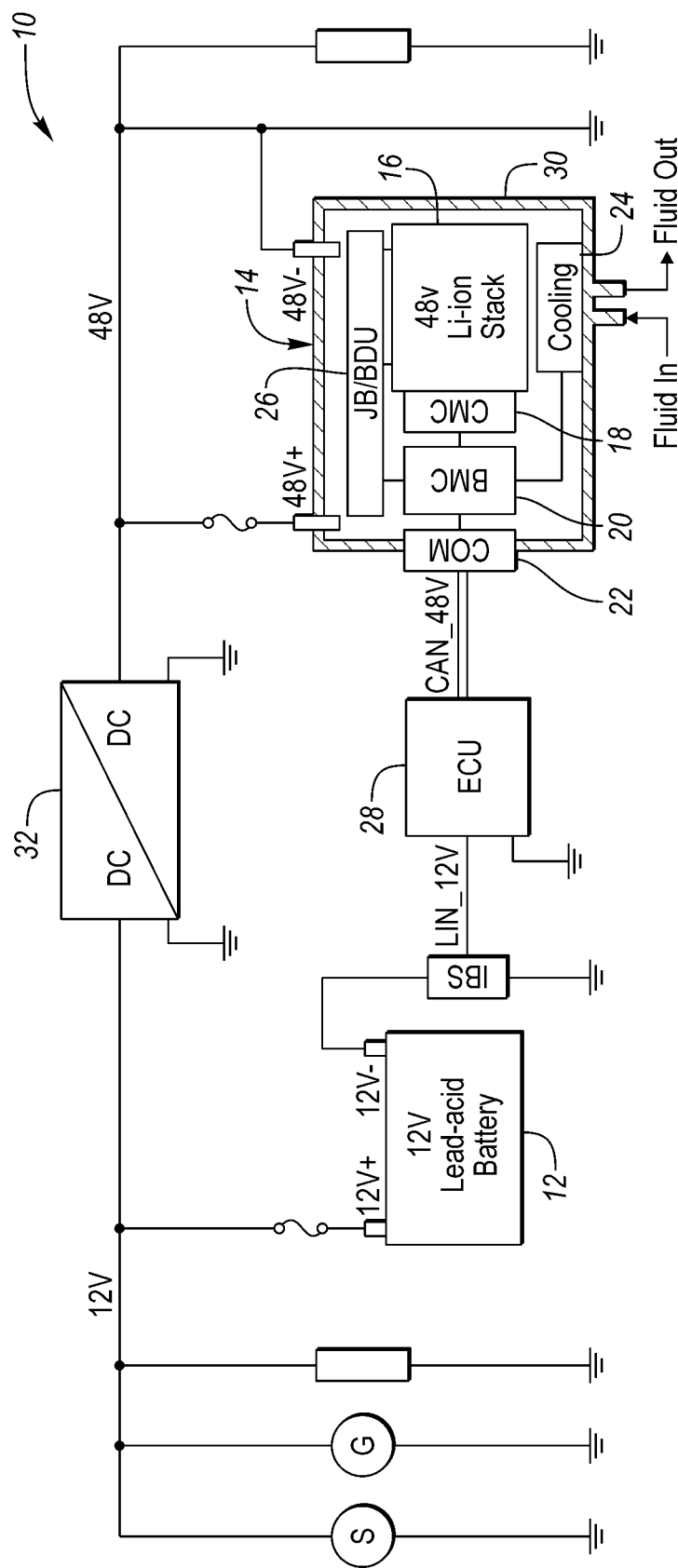
FIG. 1 illustrates a block diagram of a conventional vehicle powernet architecture including a battery assembly having a lead-acid battery and a lithium-ion (Li-Ion) battery.

Referring now to FIG. 1, a block diagram of a conventional vehicle powernet architecture including a battery assembly 10 having a lead-acid battery 12 and a Lithium-Ion (Li-Ion) battery pack 14 is shown. Li-Ion battery pack 14 includes a Li-Ion battery 16. Battery 16 is in the form of a stack of Li-Ion battery cells. As such, battery assembly 10 includes two batteries: lead-acid battery 12 and Li-Ion battery 16. As an example, battery 12 is a 12V battery and battery 16 is a 48V battery.

Conventional internal combustion engine (ICE) vehicles having alternators with energy recovery capabilities (i.e., micro-hybrid (µH)) are being developed to use Li-Ion batteries. Battery assembly 10 is for such ICE vehicles with energy recovery capabilities.

Li-Ion battery pack 14 further includes a cell module controller (CMC) 18, a battery module controller (BMC) 20, a common I/O (e.g., a connector) (COM) 22, a cooling system 24, and protection mechanisms like fuses, transient voltage suppressors, and battery disconnection devices ("Junction Box/Battery Disconnection Unit") (JB/BDU) 26. CMC 18 is associated with battery 16 and is configured to measure cell voltages and perform cell balancing of battery cells of battery 16. CMC 18 is further configured to protect battery 16 from exceeding maximum ratings by reporting alarm messages to BMC 20. BMC 20 is configured to measure the voltage of battery 16 and control balancing time of CMC 18. BMC 20 is further configured to act as a gateway via COM 22 to an external electronic control unit (ECU) 28 of battery assembly 10. ECU 28 runs a battery management algorithm (BMS) for battery assembly 10. BMC 20 is further configured to act as a gateway to cooling system 24 and JB/BDU 26. Cooling system 24 is configured to control temperature (cooling and/or heating) of battery pack 14.

Battery pack 14 further includes a battery housing 30. Battery 16, CMC 18, BMC 20, COM 22, cooling system 24, and JB/BDU 26 are contained within battery housing 30.

Battery assembly 10 may further include a bidirectional DC/DC converter 32. Converter 32 provides voltage conversion between batteries 12 and 16 when voltages from the batteries are different.

Figure 2:
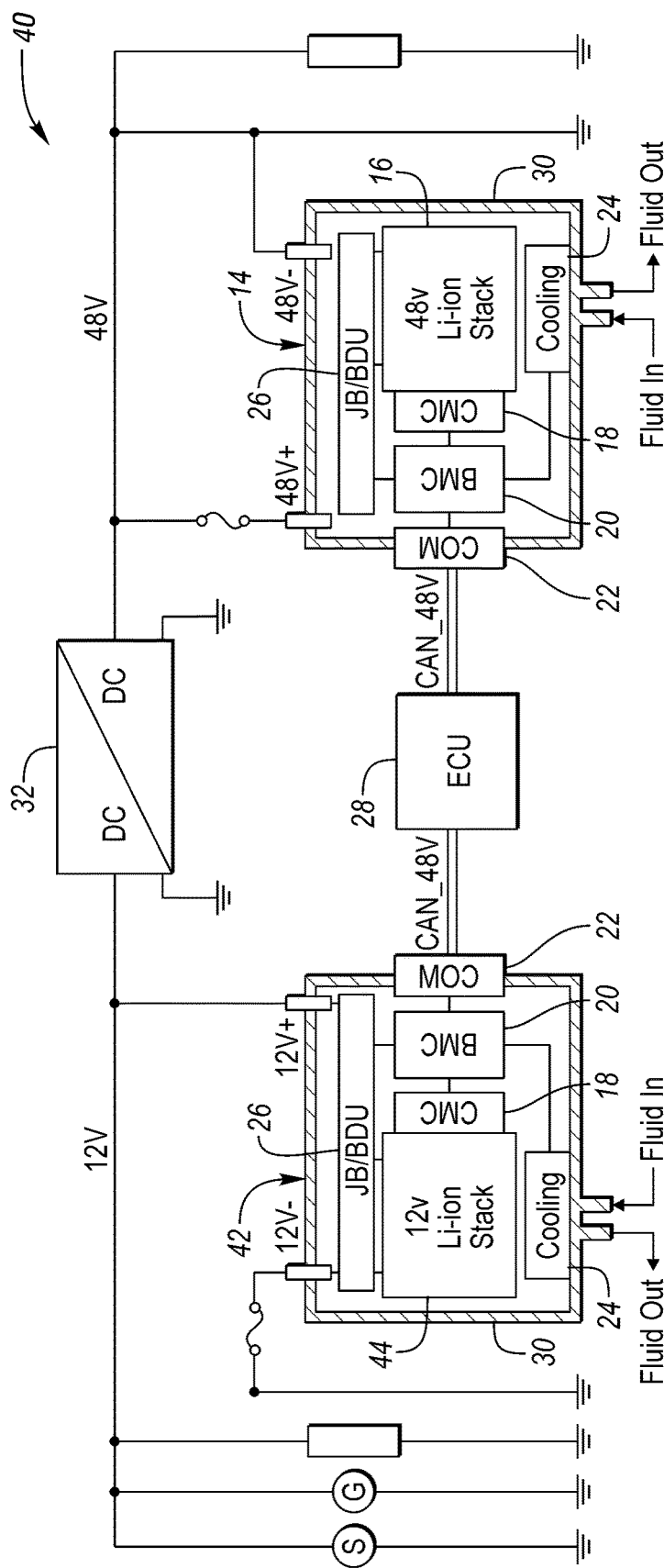
FIG. 2 illustrates a block diagram of a conventional vehicle powernet architecture including a battery assembly having two Li-Ion batteries.

Referring now to FIG. 2, with continual reference to FIG. 1, a block diagram of a conventional vehicle powernet architecture including a battery assembly 40 having Li-Ion battery pack 14 and a second Li-Ion battery pack 42 is shown. Second Li-Ion battery pack 42 includes a Li-Ion battery 44. Battery 44 is in the form of a stack of Li-Ion battery cells just like battery 16 of first Li-Ion battery pack 14 of battery assembly 10 shown in FIG. 1.

Battery assembly 40 differs from battery assembly 10 shown in FIG. 1 by including second Li-Ion battery pack 42 in place of lead-acid battery 12. Second Li-Ion battery pack 42 is an attractive substitution of lead-acid battery 12 because Li-Ion battery 44 presents several advantages over a lead-acid battery. These advantages include higher energy density, higher charge/discharge cycles, and lower weight at equivalent capacity with corresponding emission reductions. As an example, battery 44 of second Li-Ion battery pack 42 is a 12V battery like lead-acid battery 12. As such, battery 44 differs from battery 16 by being a 12V battery whereas battery 16 is a 48V battery. Of course, batteries 16 and 44 can have different voltages other than 12V and 48V.

Second Li-Ion battery pack 42 includes the same components as first Li-Ion battery pack 14 and these same components are designated with the same reference numerals. Second Li-Ion battery pack 42 includes a CMC 18, a BMC 20, a COM 22, a cooling system 24, a JB/BDU 26, and a battery housing 30. CMC 18, BMC 20, COM 22, cooling system 24, and JB/BDU 26 of second Li-Ion battery pack 42 are contained within battery housing 30 of the second Li-Ion battery pack.

Figure 3:
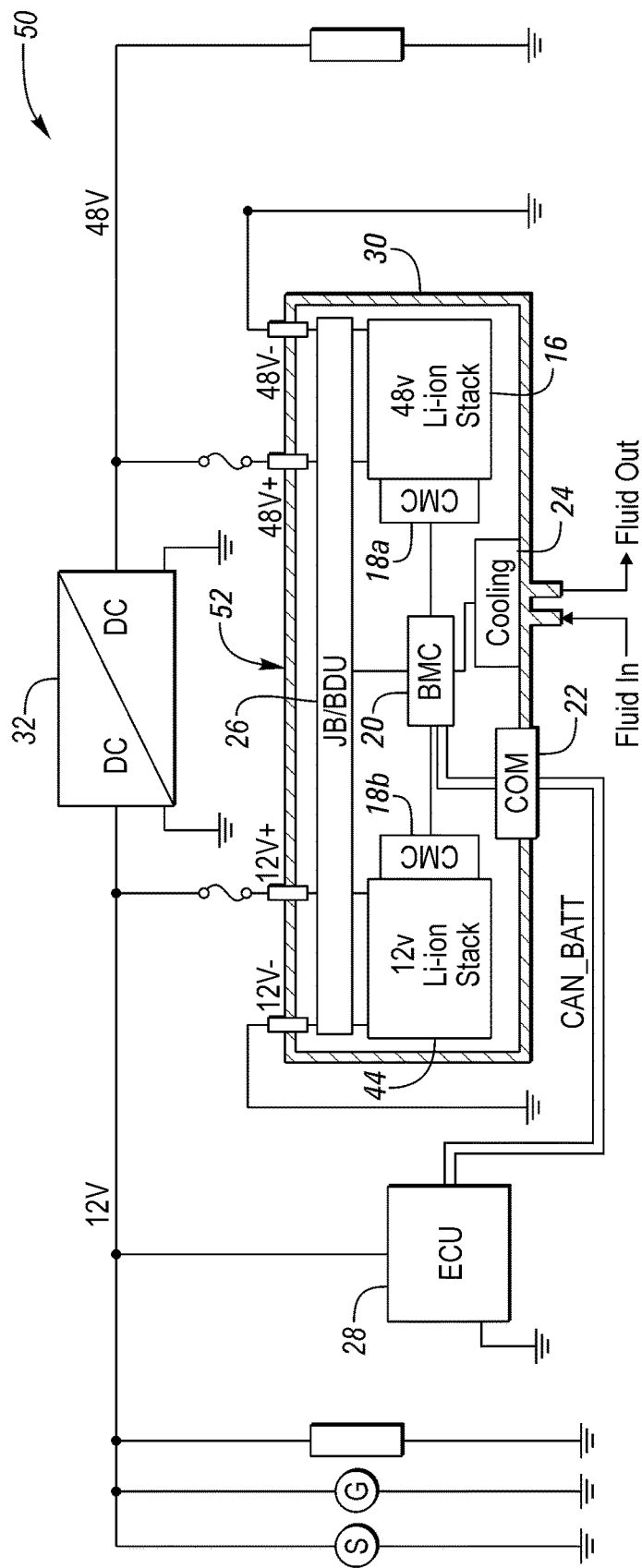
FIG. 3 illustrates a block diagram of a vehicle powernet architecture including a battery assembly having a dual voltage battery pack with a common battery management system.

Referring now to FIG. 3, with continual reference to FIG. 2, a block diagram of a vehicle powernet architecture including a battery assembly 50 having a dual voltage battery pack 52 with a common battery management system is shown. Battery pack 52 is an enhanced integrated solution which incorporates multiple individual batteries (e.g., first Li-Ion battery 16 and second Li-Ion battery 44) with their associated electronic and mechanical components, infrastructure, and operation (e.g., CMC 18a, CMC 18b, BMC 20, COM 22, cooling 24, JB/BDU 26, and the battery management algorithm (BMS)) into a single and unified battery pack.

As can be seen from a comparison of FIG. 3 with FIG. 2, battery pack 52 provides an integration of first Li-Ion battery pack 14 and second Li-Ion battery pack 42 into a single Li-Ion battery pack 52. Battery pack 52 includes first Li-Ion battery 16 and second Li-Ion battery 44. Battery pack 52 includes the same components as battery packs 14 and 42 and these same components are designated with the same reference numerals. However, battery pack 52 differs from battery packs 14 and 42 in that battery pack 52 generally includes just one of each of the components whereas each of battery packs 14 and 42 include one of the components. As a result, battery pack 52 generally includes one set of the components whereas battery packs 14 and 42 in combination include two sets of the components.

An exception of battery pack 52 including one set of the components is that battery pack 52 includes two CMCs just like battery packs 14 and 42 in combination. Battery pack 52 includes a first CMC 18a associated with battery 16 and a second CMC 18b associated with battery 44. First CMC 18a is configured to measure cell voltages and perform cell balancing of battery cells of battery 16. Likewise, second CMC 18b is configured to measure cell voltages and perform cell balancing of battery cells of battery 44.

Battery pack 52 further includes a BMC 20, a COM 22, a cooling system 24, a JB/BDU 26, and a battery housing 30. Battery pack 52 includes a single one of each of these components (BMC 20, COM 22, cooling system 24, JB/BDU 26, and battery housing 30). BMC 20, COM 22, cooling system 24, and JB/BDU 26 of battery pack 52 are contained within battery housing 30 of battery pack 52. BMC 20, COM 22, cooling system 24, and JB/BDU 26 of battery pack 52 are "common" components of battery pack 52 in that they handle the associated functions and responsibilities for multiple batteries 16 and 44.

In contrast, battery packs 14 and 42 in combination include two sets of these components and each set of the components handles the associated functions and responsibilities for one of batteries 16 and 44, respectively. That is, unlike battery pack 52, in battery packs 14 and 42 batteries 16 and 44 are contained within their own separate housings and have within their own housings their own electronic/mechanical components such as their own BMC, COM, cooling system, and JB/BDU as shown in FIG. 2.

First CMC 18a is further configured to protect battery 16 from exceeding maximum ratings by reporting alarm messages to BMC 20. Likewise, second CMC 18b is further configured to protect battery 44 from exceeding maximum ratings by reporting alarm messages to BMC 20. BMC 20 is configured to measure the voltages of batteries 16 and 44 and control balancing time of CMCs 18a and 18b. BMC 20 includes communication means to communicate with ECU 28 through a single bus (CAN_BATT) via COM 22 (e.g., a communications hardware connector) of battery housing 30. ECU 28 runs battery management algorithm for battery assembly 50. BMC 20 is further configured to act as a gateway to cooling system 24 and JB/BDU 26.

Although not required, the Li-Ion batteries of battery pack 52 are of different voltages (e.g., battery 16 is a 48V battery and battery 44 is a 12V battery). Battery pack 52 is thus a multiple voltage battery pack with a common battery management system. In battery pack 52, Li-Ion battery 44 (a 12V battery) handles the battery power tasks of a conventional 12V lead-acid battery and Li-Ion battery 16 (a 48V battery) enables vehicle energy recovering capabilities as well as feeding any load connected to a 48V power net. As such, battery pack 52 provides an automotive electrical energy storage using multiple Li-Ion batteries for vehicles with energy recovery capabilities. As set forth herein, such vehicles include ICE vehicles having energy recovery capabilities (i.e., micro-hybrids), and HEV, PHEV, and EV type of vehicles.

As described, battery pack 52 includes multiple individual batteries 16 and 44 which share or have in common various hardware and electronics. In particular, batteries 16 and 44 share a common BMC 20, a common COM 22, a common cooling system 24, and a common JB/BDU 26. As such, battery pack 52 is a unified battery pack which has multiple Li-Ion batteries 16 and 44 with associated electronics (BMC, CMC, COM, cooling) as well as a common battery management algorithm/system (BMS) and battery disconnect devices (i.e., JB/BDU) in a single and unified pack.

A multiple voltage battery pack including two or more batteries with a common battery management system, such as battery pack 52, forms a unique battery pack that provides several advantages. The advantages include integration of packing and cooling system, reduction of electronic components by integrating BMCs 20 controlling the battery management system of the multiple battery packs 14 and 42 into a single shared BMC 20, and reduction of interconnections and wiring between battery packs 14 and 42, as can be seen from a comparison of FIG. 2 with FIG. 3.

Although batteries 16 and 44 of battery pack 52 were described as being Li-Ion batteries, neither battery is required to be a Li-Ion battery. For instance, one of batteries 16 and 44 can be a Li-Ion battery and the other of batteries 16 and 44 can be some other type of battery. Further, battery pack 52 can have more than two batteries.

Battery pack 52 has been described and illustrated herein as having a 48V/12V architecture. However, battery pack 52 can have a different architecture such as a 400V/12V architecture, a 400V/48V architecture, a 400V/48V/12V architecture, etc. Further, battery pack 52 can have a multiple battery architecture having the same voltage, integrated into a single battery pack with the same benefits and enhancements described herein. More generally, battery pack 52 may have any number of batteries having the same or different voltages in which the batteries are integrated into a single unified battery pack having a common BMS with the same benefits and enhancements described herein.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A battery pack comprising:
   a first battery having a first voltage;
   a second battery remotely separated from the first battery and having a second voltage, wherein the second voltage is different from the first voltage;
   a plurality of components to be shared by the first battery and the second battery;
   a battery housing having a first electrical port and a second electrical port; and
   wherein the first battery, the second battery, and the components are contained within the battery housing, the first battery is connected via the first electrical port of the battery housing to a first voltage bus external to the battery housing to output the first voltage through the first electrical port of the battery housing to the first voltage bus, and the second battery is connected via the second electrical port of the battery housing to a second voltage bus external to the battery housing to output the second voltage through the second electrical port of the battery housing to the second voltage bus; and
   wherein the components include a battery disconnection unit configured to disconnect the first battery from the first voltage bus and the second battery from the second voltage bus.

2. The battery pack of claim 1 wherein:
   the first battery is a Lithium-Ion battery having a plurality of battery cells.

3. The battery pack of claim 2 wherein:
   the second battery is a second Lithium-Ion battery having a second plurality of battery cells.

4. The battery pack of claim 3 wherein:
   the components include a battery module controller configured to perform at least one of receive alarm messages from cell module controllers respectively associated with the first and second batteries, measure voltages of the first and second batteries, and control balancing time of the cell module controllers.

5. The battery pack of claim 4 wherein:
   the components further include a communications connector exposed to an environment external to the battery housing; and
   the battery module controller is further configured to communicate with an external electronic control unit via the communications connector.

6. The battery pack of claim 1 wherein:
   the components further include a cooling system configured to control temperature of the first and second batteries.

7. A battery assembly comprising:
   a battery pack including a first battery having a first voltage, a second battery remotely separated from the first battery and having a second voltage, a plurality of components common to both the first battery and the second battery, and a battery housing having a first electrical port and a second electrical port, wherein the second voltage is different from the first voltage, wherein the first battery, the second battery, and the components are contained within the battery housing, the first battery is connected via the first electrical port of the battery housing to a first voltage bus external to the battery housing to output the first voltage through the first electrical port of the battery housing to the first voltage bus, and the second battery is connected via the second electrical port of the battery housing to a different second voltage bus external to the battery housing to output the second voltage through the second electrical port of the battery housing to the second voltage bus;
   an electronic control unit remotely separated from the battery pack, the electronic control unit configured to control operation of the battery pack; and
   wherein the components include a battery disconnection unit configured to disconnect the first battery from the first voltage bus and the second battery from the second voltage bus.

8. The battery assembly of claim 7 wherein:
   the first battery is a Lithium-Ion battery having a plurality of battery cells and the second battery is a second Lithium-Ion battery having a second plurality of battery cells.

9. The battery assembly of claim 8 wherein:
   the components include a battery module controller configured to perform at least one of receive alarm messages from cell module controllers respectively associated with the first and second batteries, measure voltages of the first and second batteries, and control balancing time of the cell module controllers.

10. The battery assembly of claim 9 wherein:

the components further include a communications connector exposed to an environment external to the battery housing, and the electronic control unit is further configured to communicate with the battery module controller via the communications connector.

11. The battery assembly of claim 10 wherein:

the components further include a cooling system configured to control temperature of the first and second batteries; and the electronic control unit is further configured to communicate with the battery module controller via the communications connector for the battery module controller to control the cooling system.

12. A battery pack comprising:

a first battery having Lithium-Ion battery cells and a first cell module controller configured to perform cell balancing of the battery cells of the first battery, the first battery having a first voltage;

a second battery having Lithium-Ion battery cells and a second cell module controller configured to perform cell balancing of the battery cells of the second battery, the second battery remotely separated from the first battery and having a second voltage, and the second voltage being different than the first voltage;

a battery module controller in communication with the cell module controllers and configured to control the cell module controllers;

a battery housing having a first electrical port and a second electrical port;

a battery disconnection unit;

wherein the batteries, the battery module controller, and the battery disconnection unit are contained within the battery housing, the first battery is connected via the first electrical port of the battery housing to a first voltage bus external to the battery housing to output the first voltage through the first electrical port of the battery housing to the first voltage bus, and the second battery is connected via the second electrical port of the battery housing to a second voltage bus external to the battery housing to output the second voltage through the second electrical port of the battery housing to the second voltage bus; and wherein the battery disconnection unit is configured to disconnect the first battery from the first voltage bus and the second battery from the second voltage bus.

13. The battery pack of claim 12 further comprising:

a communications connector contained within the battery housing and exposed to an environment external to the battery housing; and the battery module controller is in communication with the connector and is further configured to communicate with an external electronic control unit via the communications connector.

14. The battery pack of claim 12 further comprising:

a cooling system contained within the battery housing and configured to control temperature of the batteries; and the battery module controller is in communication with the cooling system and is further configured to control the cooling system.

* * * * *

UNITED STATES PATENT AND TRADEMARK OFFICE
CERTIFICATE OF CORRECTION

PATENT NO. : 10,103,411 B2
APPLICATION NO. : 14/791550
DATED : October 16, 2018
INVENTOR(S) : Federico Giordano et al.

Page 1 of 1

It is certified that error appears in the above-identified patent and that said Letters Patent is hereby corrected as shown below:

In the Claims

Column 6, Lines 48-49, Claim 7:
After "the battery housing to a"
Delete "different".

Signed and Sealed this
Nineteenth Day of March, 2019

Andrei Iancu
*Director of the United States Patent and Trademark Office*